US012158920B2

(12) United States Patent
Atluri et al.

(10) Patent No.: US 12,158,920 B2
(45) Date of Patent: Dec. 3, 2024

(54) PERSONALIZED MESSAGING AND CONFIGURATION SERVICE

(71) Applicant: Intuit Inc., Mountain View, CA (US)

(72) Inventors: Ashwith Atluri, Karnataka (IN); Havyas H K, Karnataka (IN); Harsh Mohan Modawel, Karnataka (IN)

(73) Assignee: Intuit Inc., Mountain View, CA (US)

( * ) Notice: Subject to any disclaimer, the term of this patent is extended or adjusted under 35 U.S.C. 154(b) by 807 days.

(21) Appl. No.: 16/983,564

(22) Filed: Aug. 3, 2020

(65) Prior Publication Data

US 2022/0035882 A1 Feb. 3, 2022

(51) Int. Cl.
| | |
|---|---|
| *G06F 16/00* | (2019.01) |
| *G06F 9/455* | (2018.01) |
| *G06F 16/9532* | (2019.01) |
| *G06F 16/9535* | (2019.01) |
| *G06F 16/9538* | (2019.01) |
| *H04L 51/224* | (2022.01) |
| *H04W 4/50* | (2018.01) |
| *H04L 67/01* | (2022.01) |
| *H04L 67/10* | (2022.01) |

(52) U.S. Cl.
CPC ...... *G06F 16/9538* (2019.01); *G06F 9/45558* (2013.01); *G06F 16/9532* (2019.01); *G06F 16/9535* (2019.01); *H04L 51/224* (2022.05); *H04W 4/50* (2018.02); *G06F 2009/45595* (2013.01); *H04L 67/01* (2022.05); *H04L 67/10* (2013.01)

(58) Field of Classification Search
CPC .. G06F 16/2365; G06F 16/148; G06F 16/178; G06F 16/24568; G06F 16/285; G06F 16/1873; G06F 16/27; G06F 21/6227; G06F 16/275; G06F 16/2358; G06F 16/245; G06F 16/244; G06F 16/221; G06F 16/2379; G06F 9/5038; G06F 16/182; G06F 16/2471; G06F 9/4881; G06F 9/54; G06F 16/278; G06F 16/00; G06F 16/2228; G06F 16/24542; G06F 16/248; H04L 63/105; H04L 63/20
See application file for complete search history.

(56) References Cited

U.S. PATENT DOCUMENTS

| | | | |
|---|---|---|---|
| 11,570,182 B1 * | 1/2023 | Tran | G06F 21/6227 |
| 2015/0032486 A1 * | 1/2015 | Francois | G06Q 10/02 |
| | | | 705/5 |
| 2019/0164176 A1 * | 5/2019 | Pydynowski | H04L 67/535 |
| 2019/0361916 A1 * | 11/2019 | Weaver | G06F 16/2365 |
| 2020/0356462 A1 * | 11/2020 | Anand | G06F 11/3495 |

* cited by examiner

*Primary Examiner* — Yicun Wu
(74) *Attorney, Agent, or Firm* — Lathrop GPM LLP

(57) ABSTRACT

A method converts a request received from a client application to a query by a serverless function operating on a virtual machine instance provisioned responsive to the request. The query is transmitted to an application database corresponding to the client application. A result is received from the application database. The result is converted into a response and the response is transmitted to the client application in response to the request. Display of the client application is updated based on response with the result.

20 Claims, 10 Drawing Sheets

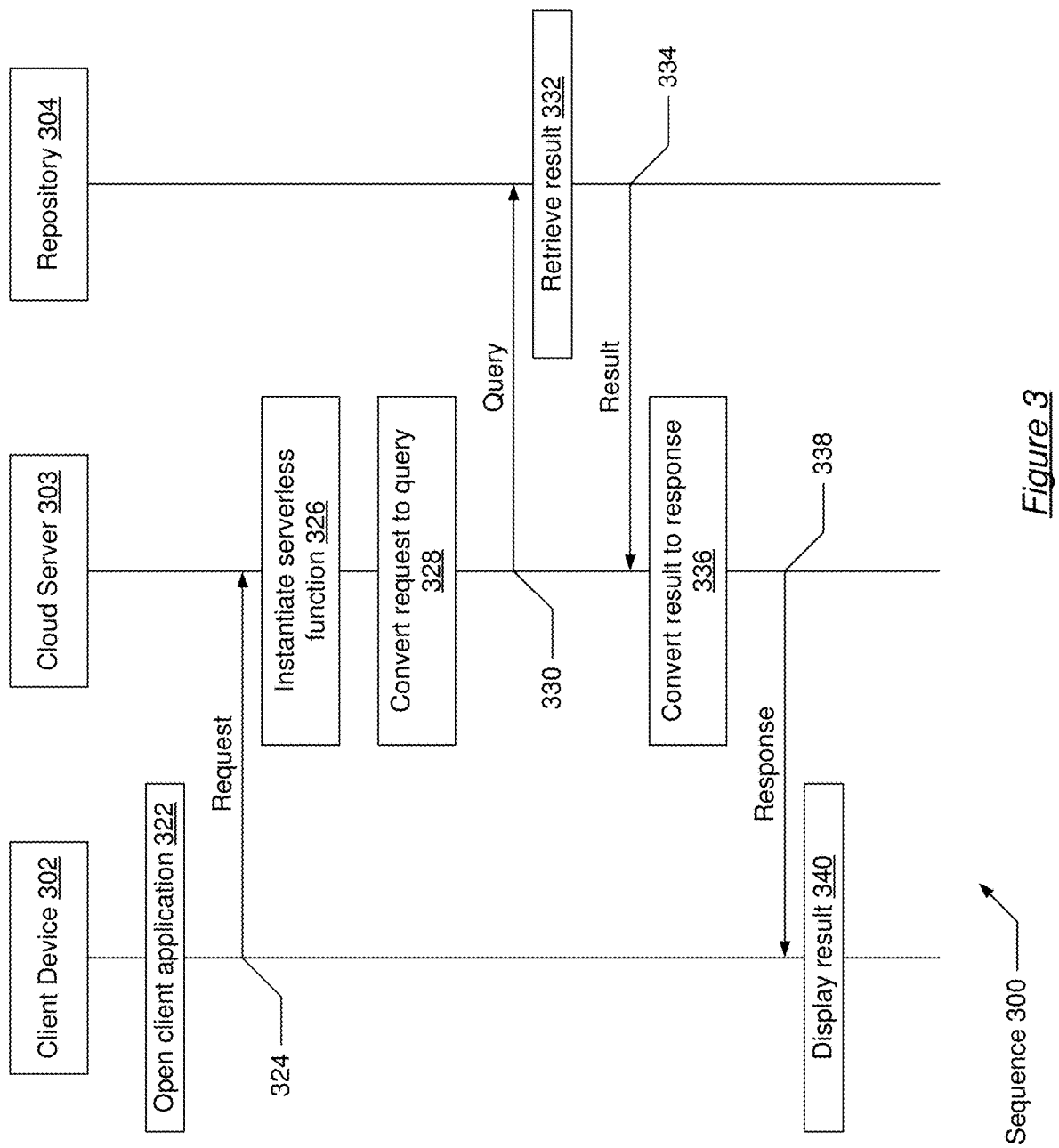

PERSONALIZED MESSAGING AND CONFIGURATION SERVICE

BACKGROUND

Desktop applications installed on personal computers often run faster than web-based applications running through a browser. A challenge is to provide notifications, configuration updates, and user interface overrides to desktop applications installed on personal computers in a manner similar to web-based applications.

SUMMARY

In general, in one or more aspects, the disclosure relates to a method that converts a request received from a client application to a query by a serverless function operating on a virtual machine instance provisioned responsive to the request. The query is transmitted to an application database corresponding to the client application. A result is received from the application database. The result is converted into a response and the response is transmitted to the client application in response to the request. Display of the client application is updated based on response with the result.

In general, in one or more aspects, the disclosure relates to a system including a client device configured to execute a client application, an application database, and a cloud server provisioned responsive to a request from the client device and configured for instantiating a serverless function with a virtual machine instance to service the request. The serverless function is configured for converting the request received from the client application to a query. The query is transmitted to the application database corresponding to the client application. A result is received from the application database. The result is converted into a response and the response is transmitted to the client application in response to the request. Display of the client application is updated based on response with the result.

In general, in one or more aspects, the disclosure relates to a method that transmits, by a client application, a request to a cloud server. The request is processed by a serverless function executing on the cloud server. The request is converted to a query by the serverless function, which operates on a virtual machine instance provisioned responsive to the request. The query is transmitted to an application database corresponding to the client application. A result is received from the application database. The result is converted into a response and the response is transmitted to the client application in response to the request. Display of the client application is updated based on response with the result. The response is received from the serverless function and information is displayed from the result with the client application.

Other aspects of the invention will be apparent from the following description and the appended claims.

BRIEF DESCRIPTION OF DRAWINGS

FIG. 3 shows a sequence diagram in accordance with disclosed embodiments.

DETAILED DESCRIPTION

Figure 1A:
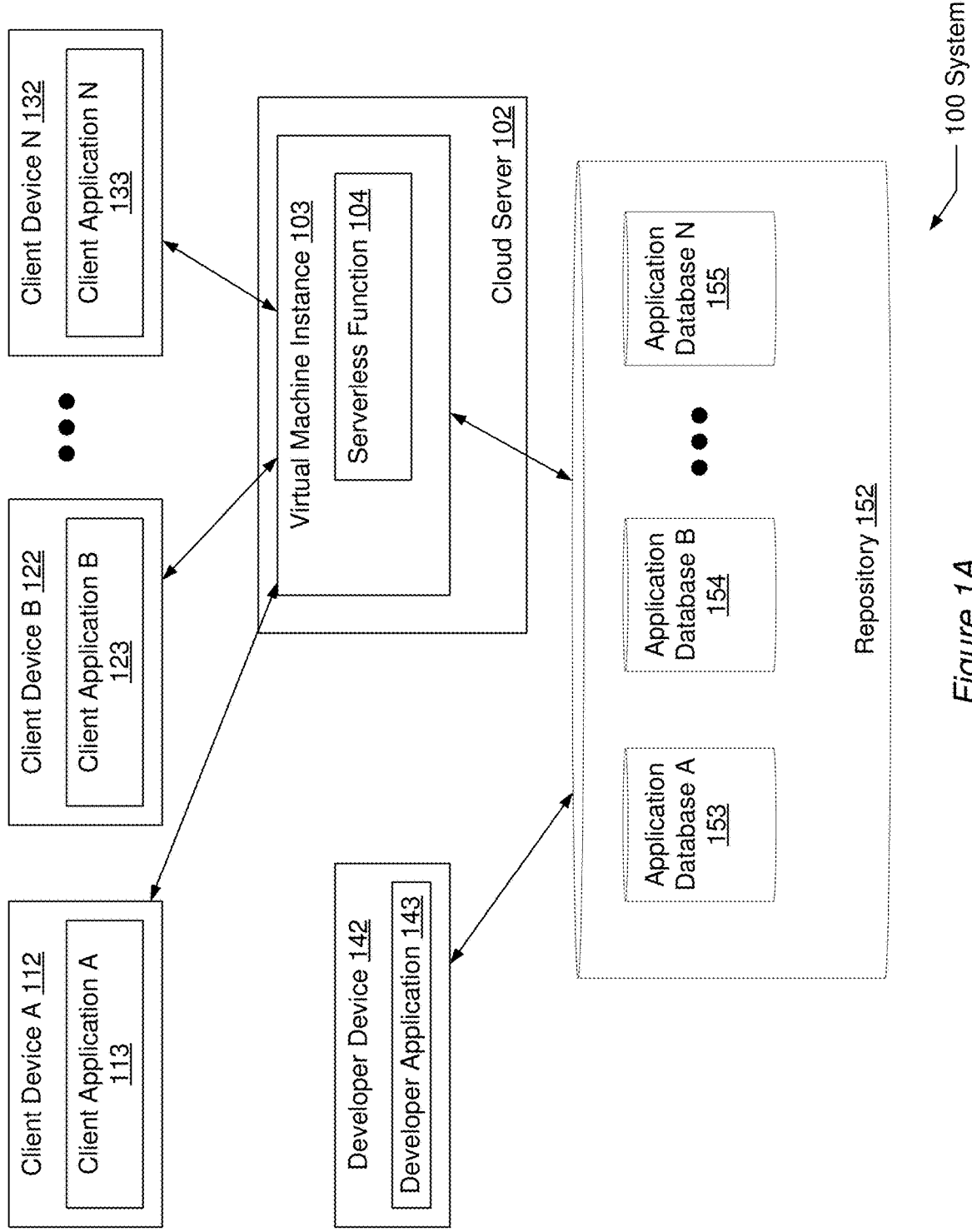
FIG. 1A and FIG. 1B show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure provide up-to-date notifications, configuration updates, and user interface overrides to installations of desktop applications. The desktop applications send requests that are processed by instances of a serverless function executing on virtual machine instances of a cloud server. After converting a request to a query and receiving results for the query, a serverless function converts the results to a response and transmits the response to the desktop application. The desktop application receives the response and is updated based on the notifications, configuration updates, and user interface overrides in the response.

Systems according to the disclosure integrate notification, configuration, and user interface override features and services into a single solution for desktop applications without having to maintain multiple separate services for these features. Unifying the concepts of notifications, configurations, and user interface overrides into a similar structure using a single service further empowers each client application utilizing the service (also known as an onboarding client application) to define a customized method for accessing and utilizing the notification, configuration, and override features for processing on the client side. Additionally, using the serverless function allows for scaling the system to handle millions of requests from client applications.

There is a single set of processing logic code forming the serverless function to handle the different requests from each for the different onboarded applications. Each of the different client applications may fully customize and define different structures, filters, and protocols for the notifications, configurations, and user interface overrides stored in separate databases for each of the different client applications.

Additional personalization is had by using filtering to target a specific group of application customers or even a single customer. A group of customers may be identified by a group identifier. A single customer may be targeted by using a universally unique identifier (UUID) that identifies a machine of a customer, which is included in a request sent to the serverless function. The serverless function may then set up a query to filter results from the databases for the specific group of customers or the single customer with the group identifier and the universally unique identifier.

Figure 1B:
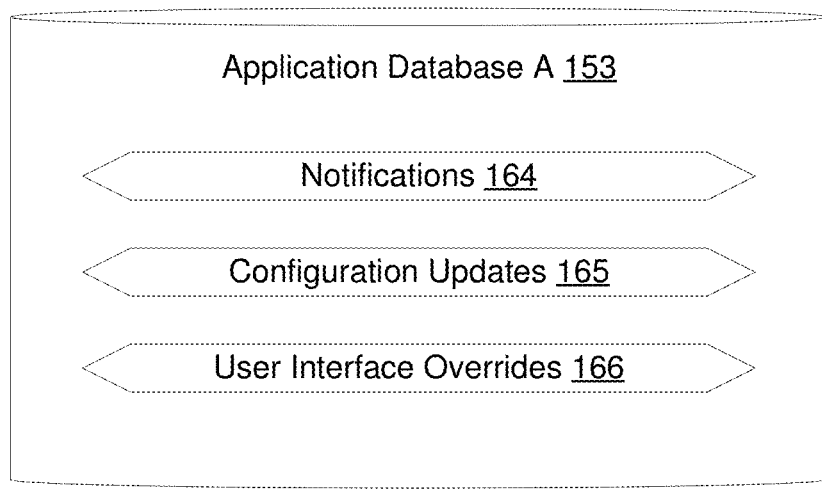

FIGS. 1A and 1B show diagrams of embodiments that are in accordance with the disclosure. FIG. 1A shows the system (100) that implements a personalized messaging and configuration service. FIG. 1B shows a database of the system (100). The embodiments of FIGS. 1A and 1B may be combined and may include or be included within the features and embodiments described in the other figures of the application. The features and elements of FIGS. 1A and 1B are, individually and as a combination, improvements to the technology of communications and application management systems. The various elements, systems, and components shown in FIGS. 1A and 1B may be omitted, repeated, combined, and/or altered as shown from FIGS. 1A and 1B. Accordingly, the scope of the present disclosure should not be considered limited to the specific arrangements shown in FIGS. 1A and 1B.

Turning to FIG. 1A, the serverless function (104) executes on the virtual machine instance (103), which is hosted by the cloud server (102). The serverless function (104) executes on demand in response to requests received from the client devices A (112) through N (132) (which may include the client device B (122)). The serverless function (104) may handle a single or multiple requests from the client applications A (113) through N (133). The serverless function includes the programs and data to receive requests from the client applications A (113) through N (133), convert the requests to database queries, convert database results to responses, and send the responses to the client applications A (113) through N (133). The serverless function (104) may be instantiated in response to the system (100) receiving a request from the client applications A (113) through N (133) and removed after the request is completed.

The virtual machine instance (103) is a virtual slice of the cloud server (102). The virtual machine instance (103) may be provisioned and instantiated on-demand in response to requests received from the client devices A (112) and B (122) through N (132). The virtual machine instance (103) includes virtual slices of the physical hardware (processors, memory, storage) of the cloud server (102) and includes the programs and data used to operate the serverless function (104). In one embodiment, the virtual machine instance (103) may be provisioned and instantiated to handle multiple requests hosting multiple serverless functions that are instantiated and then removed on a request by request basis.

Figure 5A:
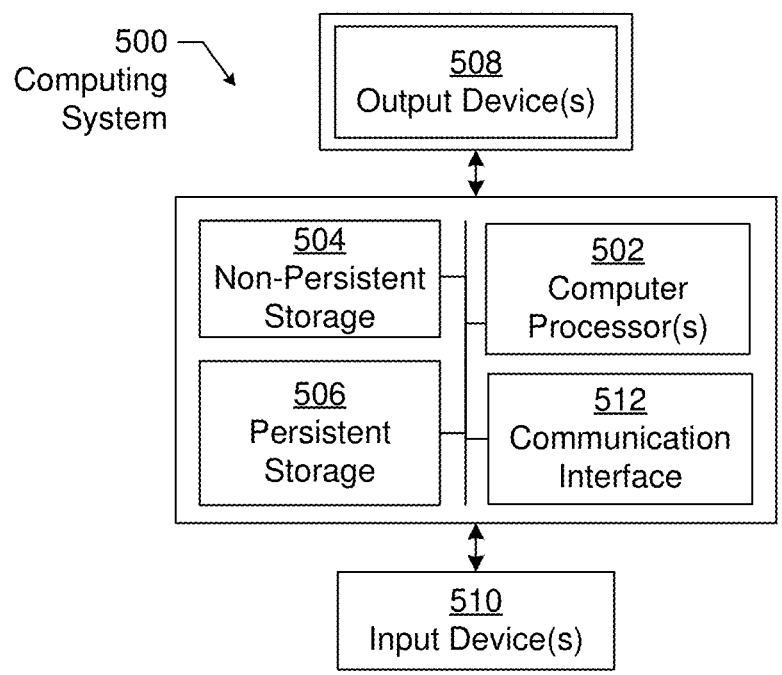
FIG. 5A and FIG. 5B show computing systems in accordance with disclosed embodiments.
Figure 5B:
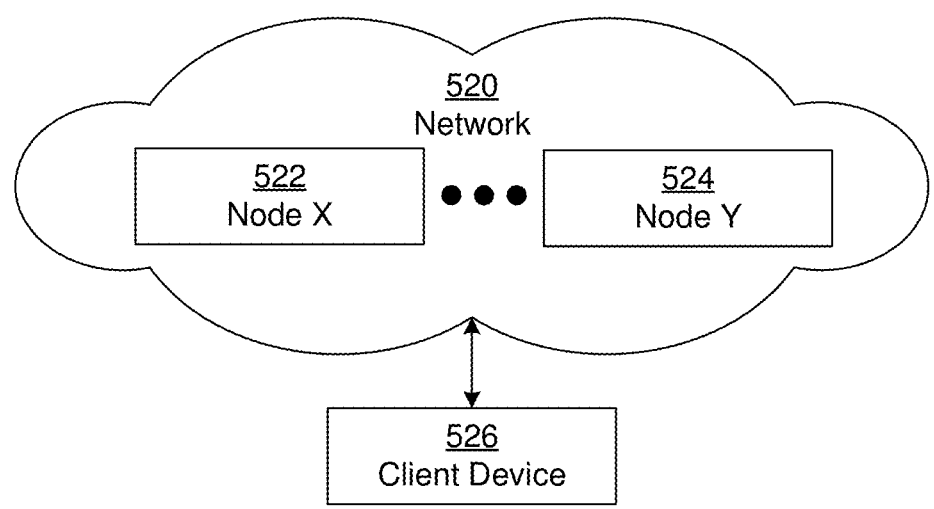

The cloud server (102) is an implementation of the computing systems of FIGS. 5A and 5B. The cloud server (102) is part of a function as a service (FaaS) platform providing serverless computing as part of a cloud computing execution model. The cloud server (102) receives requests from and transmit responses to the client devices A (112) through N (132). The cloud server (102) transmits queries to and receives results from the repository (152).

The cloud server (102) may be hosted by a cloud services provider to deploy the serverless function (104) for an application services provider. The cloud server (102) and the virtual machine instance (103) are maintained by the cloud service provider and not by the application service provider. The application service provide is only responsible for the operation of the serverless function (104).

The client devices A (112) and B (122) through N (132) are implementations of the computing systems of FIGS. 5A and 5B and may be implemented as personal computers, smartphones, tablet computers, etc. The client devices A (112) through N (132) may be used by a user of the system to operate the client applications A (113) and B (123) through N (133).

The client applications A (113) through N (133) (which may include the client device B (122)) include programs and data that execute and are stored on the client devices A (112) through N (132). The client applications A (113) through N (133) send requests to the serverless function (104) and receives responses from the serverless function (104) that include notifications, configuration updates, and user interface overrides from the application databases A (153) through N (155) (which may include the application database B 154). As an example, client applications A (113) through N (133) may include tax an accounting software used to generate tax and accounting reports. The client applications A (113) through N (133) may include multiple interfaces (a graphical user interface, application programming interfaces, etc.) and may interact with the serverless function (104). The client applications A (113) through N (133) may be desktop applications that run under a desktop operating system. The client applications A (113) through N (133) may be configured and display notifications based on interaction with the serverless function (104). Each of the client applications A (113) through N (133) may have different versions with different installed features.

The developer device (142) is an embodiment of the computing systems of FIGS. 5A and 5B. The developer device (142) includes the developer application (143).

The developer application (143) is used to maintain the client applications A (113) through N (133) using the serverless function (104). The developer application (143) may include a graphical user interface for interacting with an integrated development environment to develop and maintain the source code and installations of the client applications A (113) through N (133). In one embodiment, the developer application (143) may be used to edit the source code of the client applications A (113) through N (133) to utilize the serverless function (104) to retrieve the notifications, configuration updates, and user interface overrides from the application databases A (153) through N (155).

The repository (152) is a computing system that may include multiple computing devices in accordance with the computing systems of FIGS. 5A and 5B. The repository (152) may be hosted by a cloud services provider for the application services provider operating the serverless function (104). The cloud services provider may provide hosting, virtualization, and data storage services as well as other cloud services and the application services provider may operate and control the data, programs, and applications that store and retrieve data from the repository. The data in the repository (152) includes the application databases A (153) through N (155).

The application databases A (153) through N (155) (which may include the application database B 154) are managed by the developer application (143) and store the notifications, configuration updates, and user interface overrides that are distributed to the client applications A (113) through N (133). Each of the application databases A (153) through N (155) may be unique to a particular application, application version, or group of applications. For example, the repository (152) may include an application database linked to each of the applications provided by the application service provider operating the system (100), which may provide notifications to each client application that sends a request to the serverless function (104). As another example, the repository (152) may include first and second application databases that correspond to first and second versions of a client application. As another example, the repository (152) may include application databases that correspond to different jurisdictions (e.g., Canada, United States of America, California, etc.).

In one embodiment, the application databases A (153) may include the notifications, configuration updates, and user interface overrides for multiple versions of the client application A (113). In one embodiment, the application databases B (154) may includes the notifications, configuration updates, and user interface overrides for multiple jurisdictions of the client application B (123).

Turning to FIG. 1B, the application database A (153) stores the notifications (164), the configuration updates (165), and the user interface overrides (166). The notifications (164), the configuration updates (165), and the user interface overrides (166) may be retrieved by the client applications A (113) through N (133).

The notifications (164) are messages displayed by the system to the users of the client applications. As an example, the notifications (164) may include a text string that is displayed by the client application A (113) when the client application A (113) is opened on the client device A (112).

The configuration updates (165) control which features of the client applications are exposed to the users of the client applications. As an example, on of the configuration updates (165) may include a JavaScript objection notation (JSON) formatted string with key value pairs that identify a feature of the client application A (113) and the availability of that feature.

The user interface overrides (166) may control the presentation of data within a user interface. For example, one of the user interface overrides may include markup in accordance with the hypertext markup language (HTML) standard that identifies that text of one of the notifications (164) uses a specific style (e.g., bold, italics, larger font size, different font, etc.).

Figure 2:
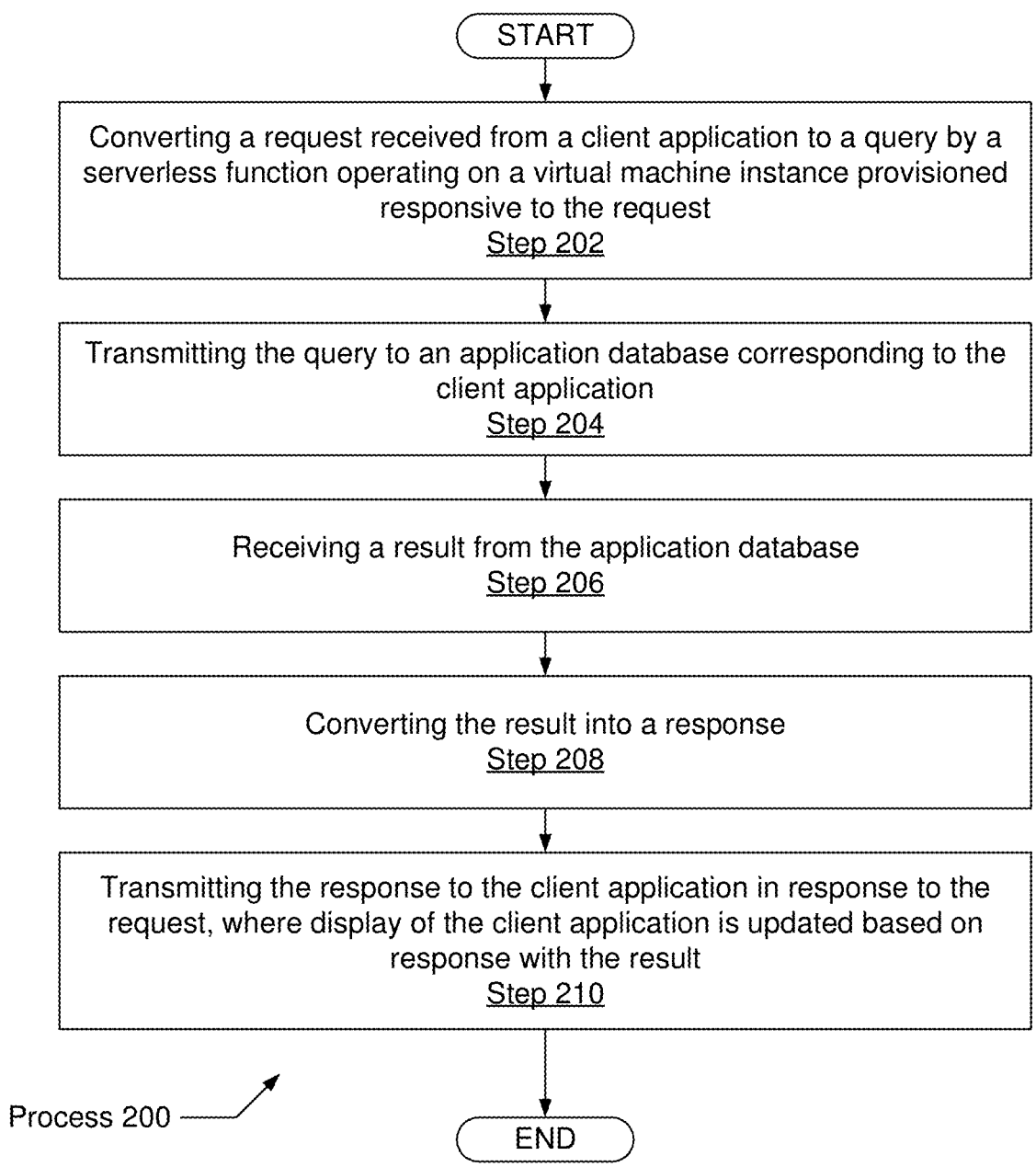
FIG. 2 shows a flowchart in accordance with disclosed embodiments.

FIG. 2 shows a flowchart and FIG. 3 shows a sequence diagram that are in accordance with the disclosure. The process (200) of FIG. 2 processes requests to provide transmits notifications, configuration updates, and user interface overrides to client applications. The sequence (300) of FIG. 3 generates, processes, and displays the result of request form the client device (302). The embodiments of FIG. 2 and FIG. 3 may be combined and may include or be included within the features and embodiments described in the other figures of the application. The features of FIG. 2 and FIG. 3 are, individually and as an ordered combination, improvements to the technology of computing systems and learning management systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2, the process (200) may execute as part of a serverless function on a virtual machine instance of a cloud server. At Step 202, requests received from a client application are converted to a query. The request may include a header and a body in accordance with the hypertext transfer protocol (HTTP) standard. The body may include a JSON formatted string with key value pairs. Information from the header and body are converted into filters of a query that locate information for the client application in application databases.

The serverless function operates on a virtual machine instance provisioned responsive to the request. The virtual machine instance and the serverless function may be provisioned and instantiated on demand. The virtual machine instance may remain active while the request is processed and may continue to remain active while multiple requests are processed. The virtual machine instance may be removed (deprovisioned) after the request is handled. The serverless function may be instantiated on the virtual machine instance to process one or multiple requests.

In one embodiment, the conversion of the request includes generating the query with a set of filters. The filters may utilize a shelf keeping unit (SKU) identifier, a tax year identifier, an operating system identifier, an architecture identifier, a platform identifier, a state identifier, a release identifier, a product identifier, a channel identifier from a body of the request to identify the result, etc.

In one embodiment, the virtual machine instance operates in a cloud server configured to provision the virtual machine instance in response to receiving the request. The serverless function is instantiated by the virtual machine instance to service the request. Instantiating the serverless function includes loading the software used by the serverless function to allow the serverless function to operate. The virtual machine instance may be deprovisioned after one or multiple requests are serviced.

In one embodiment, the request may include a header with an application key and a transaction identifier. The application key may uniquely identify the installation of the client application on a client device. The transaction identifier may uniquely identify the request from the client application. In one embodiment, the response is generated with a header that includes a transaction identifier matching a transaction identifier from a header of the request.

In one embodiment, the result may include java script object notation (JSON) formatted text. The JSON formatted text organizes the information in the result with key value pairs.

In one embodiment, the response is generated with a body that includes a notification with a jurisdiction specific message. For example, the notification may be linked to installations of client applications that include features for the state of California.

In one embodiment, the response is generated with a body that includes a configuration update to enable a feature of the application based on a date. For example, the configuration update may enable Canada Revenue Agency (CRA) import function that is disabled until a specified date.

In one embodiment, the response is generated with a body that includes a user interface override that is displayed on the client device. For example, the user interface override may change the font style of text displayed with the client application.

At Step 204, the query is transmitted to an application database corresponding to the client application. In one embodiment, after generating the query using the information from the request, the serverless function transmits the query to a cloud based database service hosting application databases that correspond to the client application that sent the request.

An application database that receives the query from the serverless function may then processes the query. The filters in the query filter the information from the application database to locate information and generate results. The results include notifications, configuration updates, and user interface overrides that correspond to the client application that generated the query.

At Step 206, results are received from the application database. After generating the results, the results are transmitted to the serverless function from the application database. The results may include JSON formatted text including one or more notifications, configuration updates, and user interface overrides.

At Step 208, the results are converted into a response. The serverless function, after receiving the results, may converts the results to the response by encapsulating a filtered version of the results into a body of the response in accordance with the HTTP standard. A header of the response may identify the request to which the response is in reference. The filtered version of the results may remove query metadata from the results to reduce the amount of bandwidth used by the system.

At Step 210, the response is transmitted to the client application in response to the request. After generating the response to the request, the serverless function transmits the response to the client application. After transmitting the response, the serverless function may become inactive or de-instantiated until the system receives a subsequent request to be processed by the serverless function.

The response is received by the client device and the client application. Display of the client application is updated based on response with the result. For example, the client application may display a notification, update the configuration of the client application using the configuration update, and use the user interface override when displaying the notification.

Turning to FIG. 3, the sequence (300) manages a client application installed on the client device (302). The sequence (300) operates on a system including the client device (302), the cloud server (303), and the repository (304), which are embodiments of the computing systems described in FIGS. 1A, 1B, 5A, and 5B.

At Step 322, the client application installed on the client device (302) is opened. Opening the client application may trigger the client application to generate the request to update the client application.

At Step 324, the request generated by the client device (302) is transmitted and then received by the cloud server (303). The request includes a body and a header that may include identifying information that identifies the client application, the version of the client application, the installation date of the client application on the client device, the operating system of the client device, the installed packages of the client application (e.g., jurisdiction specific packages), and may identify a user linked to the client application, or user key linked to the client application.

At Step 326, a serverless function is instantiated on the cloud server (303). The serverless function may be instantiated on virtual machine instance provisioned on the cloud server (303).

At Step 328, the request from the client device (302) is converted to a query. The request may be converted by filtering the request for the identifying information and creating query commands into which the identifying information is inserted. The query commands with the identifying information form filters to identify information from the application databases in the repository (304) that are responsive to the request from the client device (302).

At Step 330, the query is transmitted from the cloud server (303) and is received by the repository (304). The query may identify one or more application databases within the repository (304).

At Step 332, results are retrieved. The repository (304) executes the query to filter the information in the application databases to the information relevant to the request from the client device, which includes notifications, configuration updates, and user interface overrides. The relevant information is packaged into the result.

At Step 334, the result is transmitted from the repository (304) and is received by the cloud server (303). The result may be JSON formatted text and include query metadata in addition to the relevant information.

At Step 336, the result is converted to a response. The cloud server (303) removes the query metadata and encapsulates the relevant information into a response.

At Step 338, the response is transmitted from the cloud server. After being transmitted, the response is received by the client device (302).

At Step 340, the result is displayed. Display of the result may include displaying the text of a notification using user interface overrides and may include enabling or disabling features of the client application running on the client device (302).

Figure 4A:
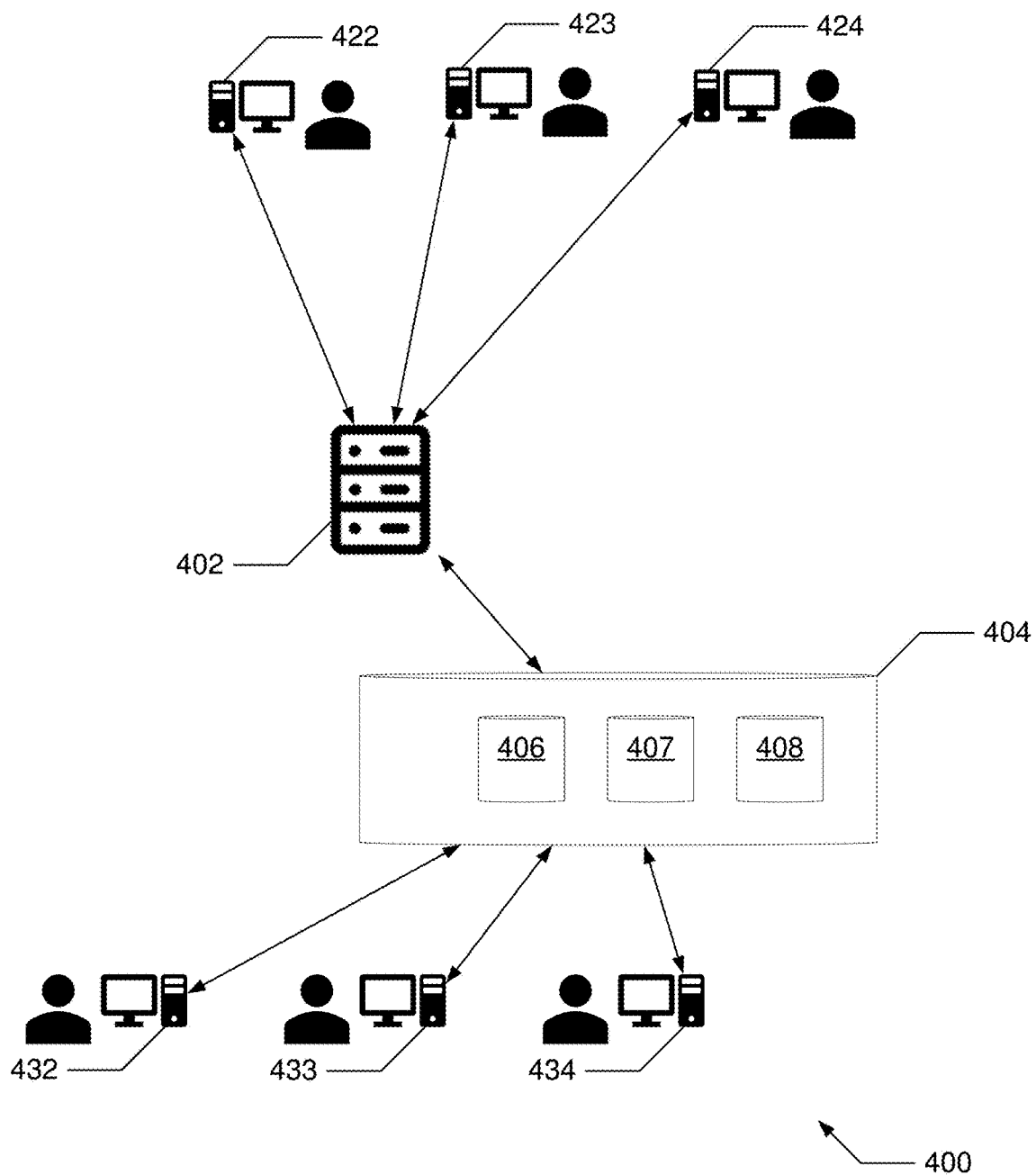
FIG. 4A, FIG. 4B, FIG. 4C, FIG. 4D, and FIG. 4E show examples in accordance with disclosed embodiments.

FIGS. 4A, 4B, 4C, 4D, and 4E show examples of systems and interfaces in accordance with the disclosure. FIG. 4A shows a system that processes requests and displays updates. FIGS. 4B through 4E show graphical user interfaces that may be updated with requests to a serverless function. The embodiments of FIGS. 4A, 4B, 4C, 4D, and 4E may be combined and may include or be included within the features and embodiments described in the other figures of the application. The features and elements of FIGS. 4A, 4B, 4C, 4D, and 4E are, individually and as a combination, improvements to the technology of computing systems and learning management systems. The various features, elements, widgets, components, and interfaces shown in FIGS. 4A, 4B, 4C, 4D, and 4E may be omitted, repeated, combined, and/or altered as shown. Accordingly, the scope of the present disclosure should not be considered limited to the specific arrangements shown in FIGS. 4A, 4B, 4C, 4D, and 4E.

Turning to FIG. 4A, three examples are described with the system (400). The system (400) includes the cloud server (402) and the repository (404), which are accessed by the client devices (422) through (424). The client devices (422) through (424) are operated by users Alice, Beatrice, and Ned to generate tax reports and accounting reports with a client application installed onto each of the client devices (422) through (424).

The repository (404) includes the application databases (406) through (408), which include notifications, configuration updates, and user interface overrides for the installations of the client application on the client devices (422) through (424). The data within the repository (404) is maintained with the developer devices (432) through (434), which are operated by the developers David, Debbie, and Dianne.

Example 1

Dianne maintains the application database (406) (of FIG. 4A) that is related to the jurisdiction of California in the United States of America. A new set of forms for California has been released and Dianne updates the application database (406) to include a notification for users of the client application with the California features installed.

Alice opens the client application on the client device (422) (of FIG. 4A) and the client application generates a request indicating that the California features are installed on the client application on the client device (422).

An example of the header of the request is shown below:

POST/HTTP/1.1

Content-Type: application/json

Authorization: COMPANY_APIKey COMPANY_apikey=apikeyvalue

COMPANY_tid: 3a69d9a7-8294-4885-b8e4-0587934eae7e client-request-version: 1.0 client-id: ttdus

Host: www.DOMAIN.com

Content-Length: 369

Below is an example of the body of the request. The key "state" with the value "CA" indicates that the California features are installed.

```
{
"userId":
"722a8801616d764ef00ec3a98b188650ff21d566294f73fbd62d478042225d9b",
"sku": "HomeAndBusiness" ,
"taxYear": "2019" ,
"os": "8.1" ,
"architecture": "x64" ,
"platform": "windows" ,
"state": [ "CA" ],
"release": "2019.41.25.242" ,
"experimentInfo": [ "FeatureFlags" ],
"product": "TurboTaxUSAWindows" ,
"channel": "Download" ,
"ttaCustomer": false ,
"amazonQuickenCustomer": false
}
```

The request is transmitted to a serverless function hosted by the cloud server (402), which converts the request to a query that is sent to the repository (404). The query includes a query command that identifies notifications linked to the California features.

Below is an example of the query generated from the request.

fe=((Attr('active').eq(True)|Attr('active').not_exists( )) &
(Attr('startEpoch').not_exists( )|Attr('startEpoch').lte(currenttime)) &
(Attr('endEpoch').not_exists( )|Attr('endEpoch').gte(currenttime)) &
(Attr(userId).contains('722a8801616d764ef00ec3a98b188650ff21d566294f73fbd 62d478042225d9b')|
(Attr(userId).eq('722a8801616d764ef00ec3a98b188650ff21d566294f73fbd62d4 78042225d9b'))|
Attr(userId).not_exists( )) & (Attr(sku).contains('HomeAndBusiness')|
(Attr(sku).eq('HomeAndBusiness'))|Attr(sku).not_exists( )) &
(Attr(taxYear).contains('2019')|(Attr(taxYear).eq('2019'))|
Attr( ).not_exists(taxYear)) & (Attr(os).contains('8.1')|(Attr(os).eq('8.1'))|
Attr(os).not_exists( )) & (Attr(architecture).contains('x64')|
(Attr(architecture).eq('x64'))|Attr(architecture).not_exists( )) &
(Attr(platform).contains('windows')|(Attr(platform).eq('windows'))|
Attr(platform).not_exists( )) & (Attr(state).contains('CA')|(Attr(state).eq('CA'))|
Attr(state).not_exists( )) & (Attr(release).contains('2019.41.25.242')|
(Attr(release).eq('2019.41.25.242'))|Attr(release).not_exists( )) &
(Attr(experimentInfo).contains('FeatureFlags')|
(Attr(experimentInfo).eq('FeatureFlags'))|Attr(experimentInfo).not_exists( )) &
(Attr(product).contains('PRODUCTUSAWindows')|
(Attr(product).eq('PRODUCTUSAWindows'))|Attr(product).not_exists( )) &
(Attr(channel).contains('Download')|(Attr(channel).eq('Download'))|
Attr(channel).not_exists( )) & (Attr(ttaCustomer).contains(false)|
(Attr(ttaCustomer).eq(false)|Attr(ttaCustomer).not_exists( )) &
(Attr(amazonQuickenCustomer).contains(false)|
(Attr(amazonQuickenCustomer).eq(false))|
Attr(amazonQuickenCustomer).not_exists( ))

The application database (406) generates a result that includes the notification created by Alice. The result is returned to the serverless function on the cloud server (402).

Below is an example the result, which is generated in response to the query.

```
{
"Items": [
{
"version": "1.0",
"active": true,
"release": [
"2019.41.25.242",
"2019.r25.040"
],
"feature": [
"All"
],
"message": "Looking for information on how COVID-19 impacts taxes?
<URLKey>Learn how COVID-19 impacts taxes</URLKey><URLValue>
https://PRODUCT.DOMAIN.com/coronavirus</URLValue>",
"ruleId": "All_message_754d2b04-af93-4d3f-9c36-6b933bb2cb09",
"title": "COVID-19 Tax Updates"
},
{
"active": true,
"configuration": false,
"feature": [
"All"
```

```
],
"message": "This message is regarding new release of California Formset.
Please update to latest version of PRODUCT to accommodate recent tax laws changes",
"product": [
"PRODUCTUSAWindows",
"PRODUCTUSAMac"
],
"ruleId": "All_message_328f5a7c-4ca7-4af0-840f-71a212b64fe7",
"state": [
"CA"
],
"title": "New California Formset Release Version Update",
"version": "2.1"
}
],
"Count": 2,
"ScannedCount": 15,
"ResponseMetadata": {
"RequestId":
"9CUCT4R413C4VSV5AH9BBAQ38NVV4KQNSO5AEMVJF66Q9ASUAAJG",
"HTTPStatusCode": 200,
"HTTPHeaders":
{
"server": "Server", "date": "Thu, 23 Apr 2020 11: 10:18 GMT",
"content-type": "application/x-amz-json -1.0 ",
"content-length": "2419 ",
"connection": "keep-alive",
"x-amzn-requestid":
"9CUCT4R413C4VSV5AH9BBAQ38NVV4KQNSO5AEMVJF66Q9ASUAAJG",
"x-amz-crc32": "1496545750"
},
"RetryAttempts": 0
}
}
```

After receiving the result, the serverless function converts the result to a response. The response is transmitted from the cloud server (402) to the client device (422).

Below is an example of the header of the response.

HTTP/1.1 200 OK
Date: Thu, 23 Apr. 2020 11:10:18 GMT
Content-Type: application/octet-stream
Content-Length: 2351
Server: nginx
Strict-Transport-Security: max-age=15552000
COMPANY_tid: 3a69d9a7-8294-4885-b8e4-0587934eae7e
x-spanid: 23ecc619-5246-4c80-8e83-9fdabad628bd
x-amzn-trace-id: Root=1-5ea17799-11b0cfb9d266dc86e324ac5e
X-Xss-Protection: 1; mode=block
X-Content-Type-Options: nosniff
Connection: keep-alive Below is an example of the body of the response. Two notifications are included, one for all products and another for California.

```
[
{
"version": "1.0",
"active": true ,
"release": [
"2019.41.25.242",
"2019.r25.040"
],
"feature": [
"All"
],
"message": "Looking for information on how COVID-19 impacts taxes?<URLKey>Learn how COVID-19 impacts taxes</URLKey><URLValue>https://turbotax.intuit.com/coronavirus</URLValue>",
"ruleId": "All_message_754d2b04-af93-4d3f-9c36-6b933bb2cb09",
"title": "COVID-19 Tax Updates"
},
{
"active": true,
"configuration": false ,
"feature": [
"All"
],
"message": "This message is regarding new release of California Formset.
Please update to latest version of TurboTax to accommodate recent tax laws changes",
"product": [
"TurboTaxUSAWindows",
"TurboTaxUSAMac"
],
"ruleId": "All_message_328f5a7c-4ca7-4af0-840f-71a212b64fe7",
"state": [
"CA"
],
"title": "New California Formset Release Version Update",
"version": "2.1"
}
]
```

The response is received by the client device (422). After receiving the response, information from the response is displayed by the client device (422) to Alice, as discussed below with FIG. 4B.

Example 2

Debbie maintains the application database (407) linked to the jurisdiction of Canada. The data import function from the Canada Revenue Agency (CRA) has been released and Debbie creates a configuration update to enable the import function on the client application for installations with Canada features.

Prior to the configuration update for enabling the import function, when Beatrice opens the client application, the import function is disabled. Debbie then adds import function to the application database (407). Later, Beatrice opens the client application on the client device and a request is sent to the cloud server (402).

Below is an example of the header of the request.
POST/https://cgpmcs-qal.api.DOMAIN.com/HTTP/1.1
Accept: */*
Authorization: COMPANY_APIKey COMPANY_apikey=apikeyvalue
Content-Type: application/jsonclient-id: ttdcan
Accept-Encoding: gzip, deflate
Host: cgpmcs-qal.api.DOMAIN.com
Content-Length: 159
Connection: Keep-Alive
Cache-Control: no-cache
Cookie:
id_b=79e82def-0107-48f2-8abf-1805aa2697bb;
id=c8f2cfe0-30e6-55a8-99db-7d4aa1572dff
Below is an example of the body of the request.

```
{
"buildVersion": "71",
"machineId":
"c29191599c8ae3f58f7fb21221ca745f8edddeb664332699bd23e297d3dbd98d",
"module": "Platinum",
"osVersion": "10.0",
"product": "TT2019"
}
```

The request is converted to a query by the serverless function executing on the cloud server (402) and transmitted to the repository (404). The repository (404) returns a result to the query, which is converted to a response by the serverless function.

Below is an example of the header of the response.
HTTP/1.1 200 OK
Date: Thu, 23 Apr. 2020 05:04:40 GMT
Content-Type: application/octet-stream
Content-Length: 5793
Connection: keep-alive
Server: nginx
Strict-Transport-Security: max-age=15552000
COMPANY_tid: 1-5ea121e8-99f94542b6bb927ce26d38b2
x-spanid: 421bb454-4c77-4eab-9e89-c255d1d1cac0
x-amzn-trace-id: Root=1-5ea121e8-99f94542b6bb927ce26d38b2
X-Xss-Protection: 1; mode=block
X-Content-Type-Options: nosniff
Below is an example of a portion of the body of the response, which includes a configuration update to enable the CRA import function.

```
{
"enabled": true,
"active": true,
"startEpoch": 1581332100.0,
"ruleId": "IMPORT_CRA_EMER_LABEL",
"message_fr": "Alerte:",
```

-continued

```
"message_en": "Alert:",
"name": "IMPORT_CRA_EMER_LABEL"
},
{
"enabled": true,
"active": true,
"startEpoch": 1581332100.0,
"ruleId": "IMPORT_CRA_EMER_BODY",
"message_fr": "Le service Préremplir ma déclaration de l'ARC est maintenant ouvert pour les déclarations de l'année 2019.",
"message_en": "CRA's Auto-fill my return service is now open for tax year 2019.",
"name": "IMPORT_CRA_EMER_BODY"
},
```

Figure 4B:
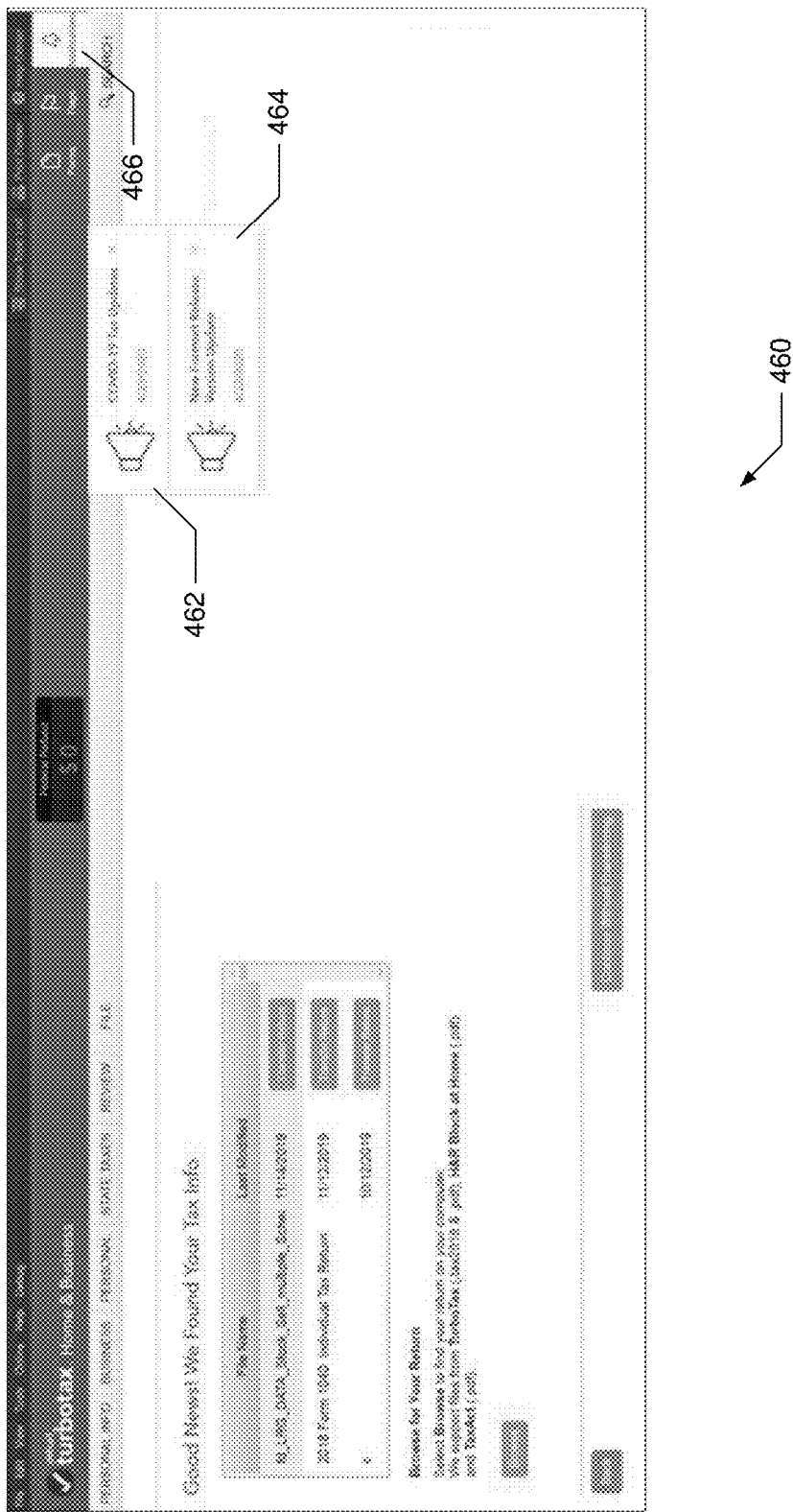
Figure 4C:
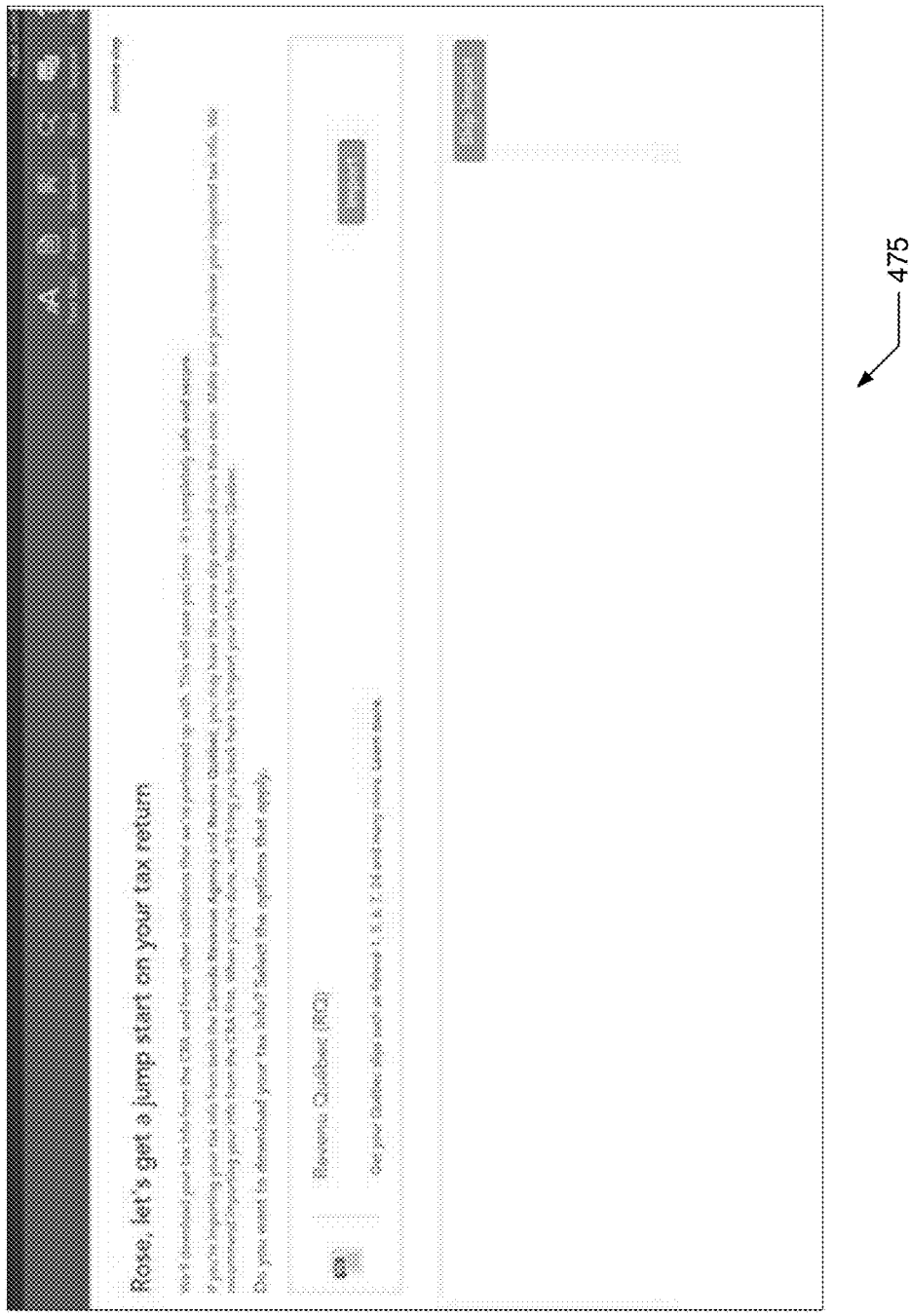
Figure 4D:
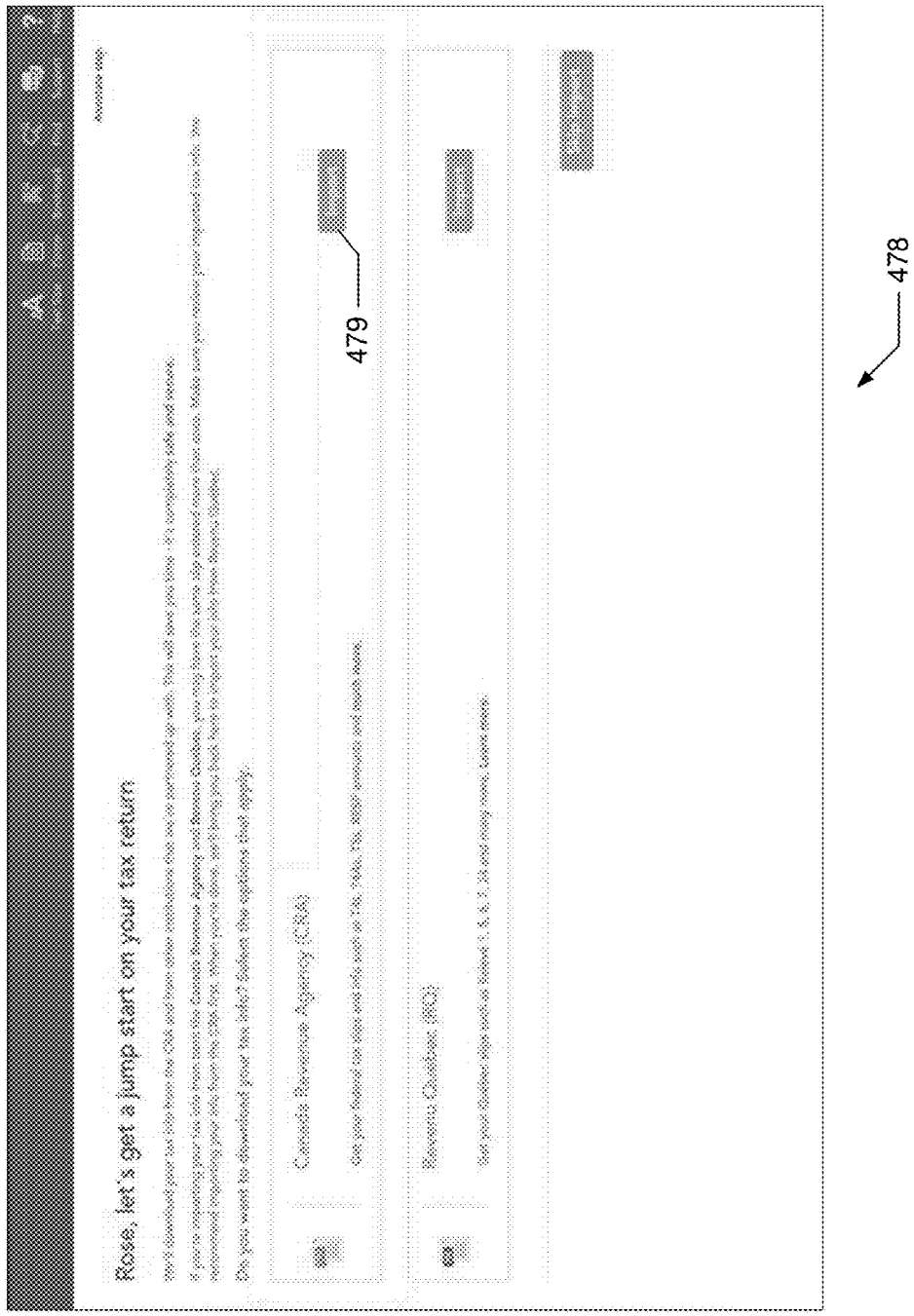

After receiving the response, the client application on the client device (423) is updated to enable and display the CRA import function, as described in FIGS. 4C and 4D.

Example 3

Dianne maintains the application database (408). Dianne adds a user interface override, as part of a notification, to the repository (404). Ned opens the client application on the client device (424). The client device sends a request to the repository (404), which returns a response with a result that includes the user interface override. The result is converted into a response transmitted to the client device (424) from the cloud server (402).

Below is an example of a portion of the body of the response that includes a user interface override. The user interface override is implemented as tags (e.g., "<a> . . . </a>", "<b . . . > . . . </b>", and "<i> . . . </i>") in the text identified with the "message_body_en" key.

```
{
"name": "TRM_EMER",
"message_label_en": "Greetings",
"enabled": true,
"message_body_fr": "{TAXP_LASTNAME} and {TAXP_FIRSTNAME|}
and{SP_FIRSTNAME|SPOUSE} and {SP_LASTNAME|SPOUSE|AST} and
{PROVINCe|province}",
"message_body_en": " {TAXP_FIRSTNAME|username}, <b style=\"font-
size:25px\"> this is text in bold</b> and <a> this is a link</a> and <i>this is
italics</i> and <u>this is underline</u> <br/>this is a new line   this
is a tab character",
"message_type": "warningxcs",
"targets":[
{
"province":[ "" ]
},
{
"province":[ "Yukon Territory", "Nunavut" ]
}
]
}
```

Figure 4E:
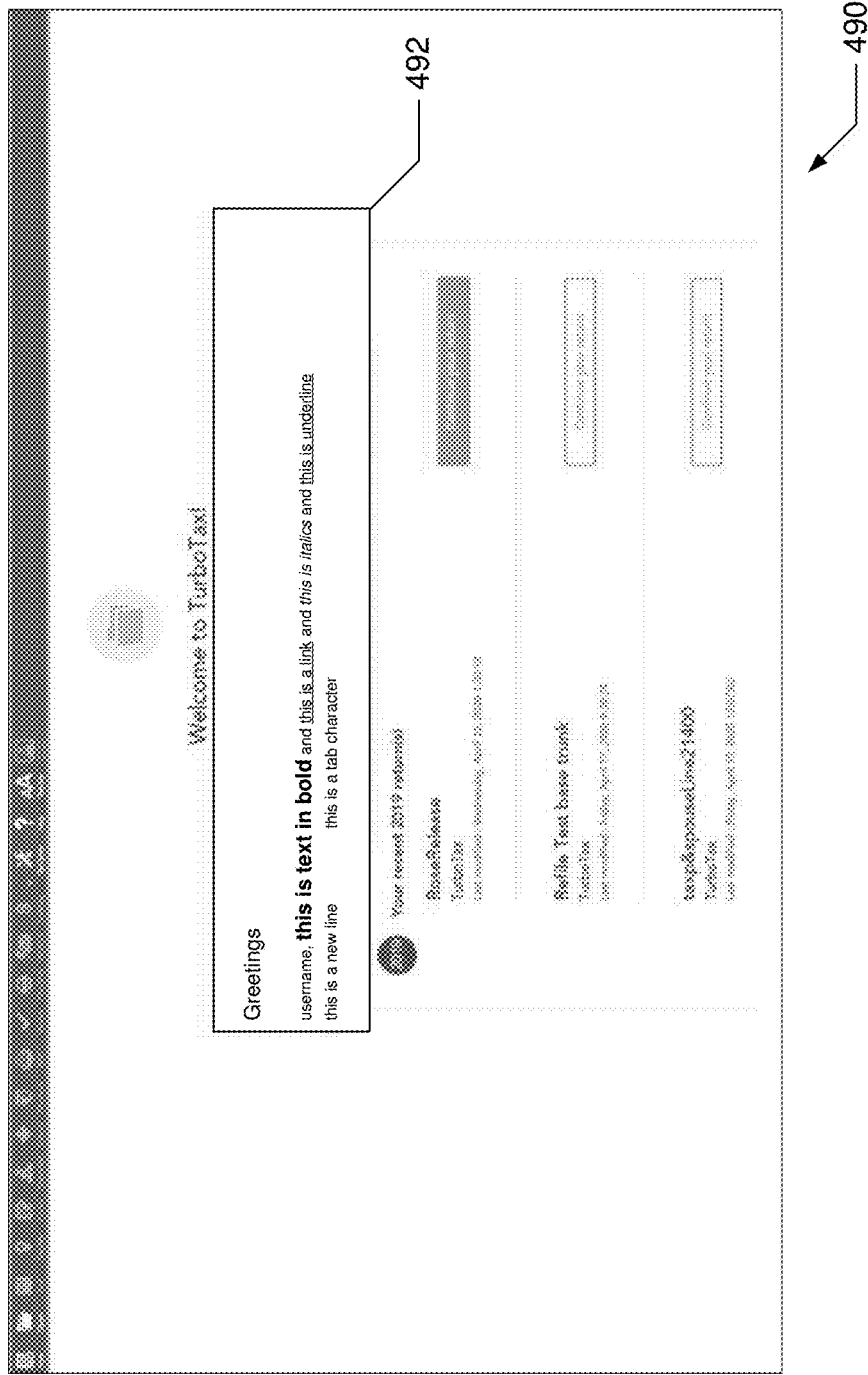

The user interface override (making a portion of text bold) is displayed as part of a notification displayed on the client device (424) by the client application, as shown in FIG. 4E.

Turning to FIG. 4B, the user interface (460) is displayed after the repository is updated. Selection of the notification button (466) triggers the display of the notification (462) and the notification (464). The notification (462) is for all versions of the client application. The notification (464) is for versions of the client application with the California features installed.

Turning to FIG. 4C, the user interface (475) is displayed prior to an update to the application database. The user interface (475) does not include the CRA import function.

Turning to FIG. 4D, the user interface (478) is displayed after an update to the application database. The user interface (478) includes the button (479) that triggers the CRA import function that was enabled by the update to the application database.

Turning to FIG. 4E, the user interface (490) is displayed after an update to the repository (404) of FIG. 4A. The user interface (490) includes the text box (492) with text displayed with different user interface overrides (bold, italics, underline, etc.).

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIG. 5A and FIG. 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hypertext Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail, such as in nested packet headers or nested document sections).

Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
converting a request received from a client application to a query, wherein the request is converted by a serverless function operating on a virtual machine instance provisioned responsive to the request;
transmitting the query to an application database corresponding to the client application;
receiving a result from the application database;
converting the result into a response; and transmitting the response to the client application in response to the request, wherein display of the client application is updated based on response with the result.

2. The method of claim 1, further comprising:
generating the query with a set of filters using one or more of a shelf keeping unit (SKU) identifier, a tax year identifier, an operating system identifier, an architecture identifier, a platform identifier, a state identifier, a release identifier, a product identifier, and a channel identifier from a body of the request to identify the result.

3. The method of claim 1,
converting the request to the query, wherein the virtual machine instance operates in a cloud server configured for:
provisioning the virtual machine instance in response to receiving the request, which is one of a plurality of requests,
instantiating the serverless function with the virtual machine instance to service the request, and
deprovisioning the virtual machine instance after the request is serviced.

4. The method of claim 1,
wherein the request comprises a header with an application key and a transaction identifier.

5. The method of claim 1,
wherein the result comprises java script object notation (JSON) formatted text.

6. The method of claim 1, further comprising:
generating the response with a header comprising a transaction identifier matching a transaction identifier from a header of the request.

7. The method of claim 1, further comprising:
generating the response with a body comprising a notification comprising a jurisdiction specific message.

8. The method of claim 1, further comprising:
generating the response with a body comprising a configuration update to enable a feature of the application based on a date.

9. The method of claim 1, further comprising:
generating the response with a body comprising a user interface override displayed on the client device.

10. A system comprising:
a client device configured to execute a client application;
an application database; and
a cloud server provisioned responsive to a request from the client device and configured for instantiating a serverless function with a virtual machine instance to service the request, the serverless function configured for:
converting, by the serverless function, the request received from the client application to a query;
transmitting the query to the application database corresponding to the client application;
receiving a result from the application database;
converting the result into a response; and
transmitting the response to the client application in response to the request, wherein display of the client application is updated based on response with the result.

11. The system of claim 10, wherein the serverless function configured for:
generating the query with a set of filters using one or more of a shelf keeping unit (SKU) identifier, a tax year identifier, an operating system identifier, an architecture identifier, a platform identifier, a state identifier, a release identifier, a product identifier, and a channel identifier from a body of the request to identify the result.

12. The system of claim 10, wherein the serverless function configured for:
converting the request to the query, wherein the virtual machine instance operates in a cloud server configured for:
provisioning the virtual machine instance in response to receiving the request, which is one of a plurality of requests,
instantiating the serverless function with the virtual machine instance to service the request, and
deprovisioning the virtual machine instance after the request is serviced.

13. The system of claim 10, wherein the request comprises a header with an application key and a transaction identifier.

14. The system of claim 10, wherein the result comprises java script object notation (JSON) formatted text.

15. The system of claim 10, wherein the serverless function configured for:
generating the response with a header comprising a transaction identifier matching a transaction identifier from a header of the request.

16. The system of claim 10, wherein the serverless function configured for:
generating the response with a body comprising a notification comprising a jurisdiction specific message.

17. The system of claim 10, wherein the serverless function configured for:
generating the response with a body comprising a configuration update to enable a feature of the application based on a date.

18. The system of claim 10, wherein the serverless function configured for:
generating the response with a body comprising a user interface override displayed on the client device.

19. A method comprising:
transmitting, by a client application, a request to a cloud server, wherein the request is processed by a serverless function by executing on the cloud server by:
converting the request to a query, wherein the request is converted by the serverless function, which operates on a virtual machine instance provisioned responsive to the request,
transmitting the query to an application database corresponding to the client application,
receiving a result from the application database,
converting the result into a response, and
transmitting the response to the client application in response to the request, wherein display of the client application is updated based on response with the result;
receiving the response from the serverless function; and
displaying information from the result with the client application.

20. The method of claim 19,
wherein the virtual machine instance operates in the cloud server, which is configured for:
provisioning the virtual machine instance in response to receiving the request, which is one of a plurality of requests, instantiating the serverless function with the virtual machine instance to service the request, and deprovisioning the virtual machine instance after the request is serviced.

* * * * *